United States Patent [19]

Frick et al.

[11] Patent Number: 5,739,897
[45] Date of Patent: Apr. 14, 1998

[54] METHOD AND SYSTEM FOR CREATING INDEX PRINTS ON AND/OR WITH A PHOTOGRAPHIC PRINTER

[75] Inventors: Beat Frick, Buchs; Robert Wahli, Wollerau; Max Nussbaumer, Bellikon, all of Switzerland

[73] Assignee: Gretag Imaging AG, Regensdorf, Switzerland

[21] Appl. No.: 515,171

[22] Filed: Aug. 15, 1995

[30] Foreign Application Priority Data

Aug. 16, 1994 [EP] European Pat. Off. ............ 94810471
Nov. 15, 1994 [CH] Switzerland ........................... 3425/94

[51] Int. Cl.⁶ ...................... G03B 27/52; G03B 27/72; G03B 27/44
[52] U.S. Cl. .................. 355/40; 355/35; 355/41; 355/42; 355/43; 355/54
[58] Field of Search ........................ 355/38, 68, 40, 355/71, 74, 77

[56] References Cited

U.S. PATENT DOCUMENTS

| | | | |
|---|---|---|---|
| 4,574,692 | 3/1986 | Wahli | 101/2 |
| 4,805,039 | 2/1989 | Otake et al. | 358/335 |
| 4,825,251 | 4/1989 | Nelson et al. | 355/27 |
| 4,903,068 | 2/1990 | Shiota | 355/20 |
| 4,922,285 | 5/1990 | Torisawa et al. | 355/20 |
| 4,933,773 | 6/1990 | Shiota et al. | 358/302 |
| 4,951,084 | 8/1990 | von Stein et al. | 355/38 |
| 4,965,662 | 10/1990 | Shiota | 358/78 |
| 5,016,043 | 5/1991 | Kraft et al. | 355/38 |
| 5,036,351 | 7/1991 | Frick et al. | 355/38 |
| 5,041,869 | 8/1991 | Frick | 355/68 |
| 5,051,773 | 9/1991 | Davis | 355/40 |
| 5,119,125 | 6/1992 | Kraft | 355/38 |
| 5,164,765 | 11/1992 | Strobel et al. | 355/38 |
| 5,184,227 | 2/1993 | Foley | 358/302 |
| 5,309,199 | 5/1994 | Frick | 355/77 |
| 5,319,407 | 6/1994 | DiRisio | 354/275 |
| 5,440,152 | 8/1995 | Manico et al. | 358/501 |
| 5,447,827 | 9/1995 | Ishikawa et al. | 430/434 |

FOREIGN PATENT DOCUMENTS

| | | |
|---|---|---|
| 0 543233A1 | 5/1993 | European Pat. Off. . |
| 0 588 331A1 | 3/1994 | European Pat. Off. . |
| 0 618 501A1 | 10/1994 | European Pat. Off. . |
| 5-11353 | 1/1993 | Japan . |
| 6-273856 | 9/1994 | Japan . |

*Primary Examiner*—R. L. Moses
*Assistant Examiner*—Shival Virmani
*Attorney, Agent, or Firm*—Burns, Doane, Swecker & Mathis, L.L.P.

[57] ABSTRACT

During the processing of an order in a photographic printer, a developed copy film strip can be scanned negative by negative and point-by-point in a scanning station of the printer. From the scan signals, density values for exposure time determination in three partial colors and details on the image field number of the scanned negative can be obtained, and these data are stored in a memory, coordinating the determined three partial exposure times with the corresponding image number. All negatives of the copy film strip are exposed successively on photographic paper on an enlarged scale, using the determined exposure times. In a further step, a number of successive negatives of the film strip are exposed on full-scale or reduced scale in matrix form onto a single sheet of said photographic paper. The image field number associated with each negative is also exposed in matrix form on the single sheet and the exposure data stored from the initial scanning procedure are used as a basis for the exposure of the individual partial images. In addition to the exposures of the negatives, further data in connection with the film strip can also be exposed.

37 Claims, 14 Drawing Sheets

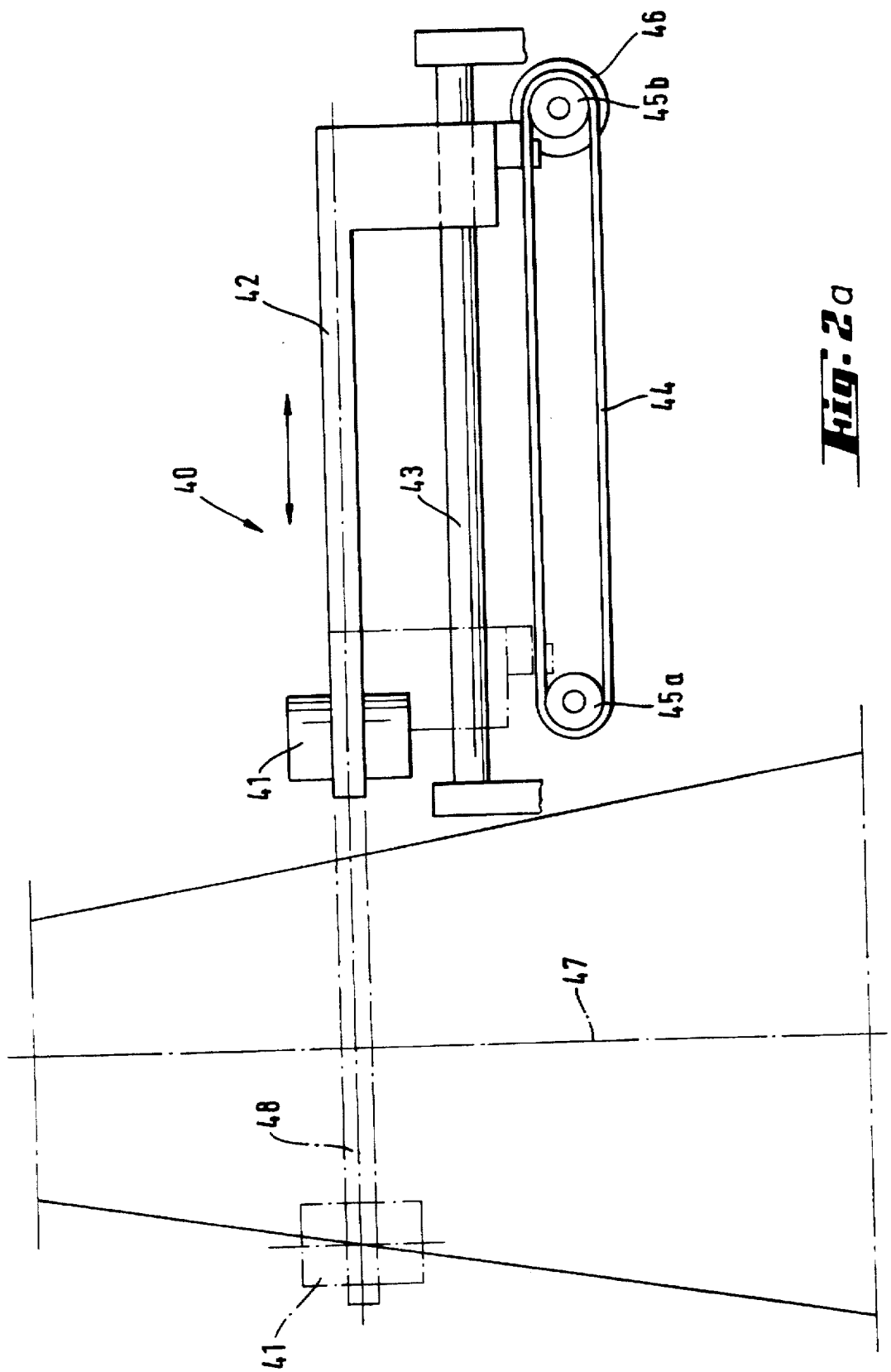

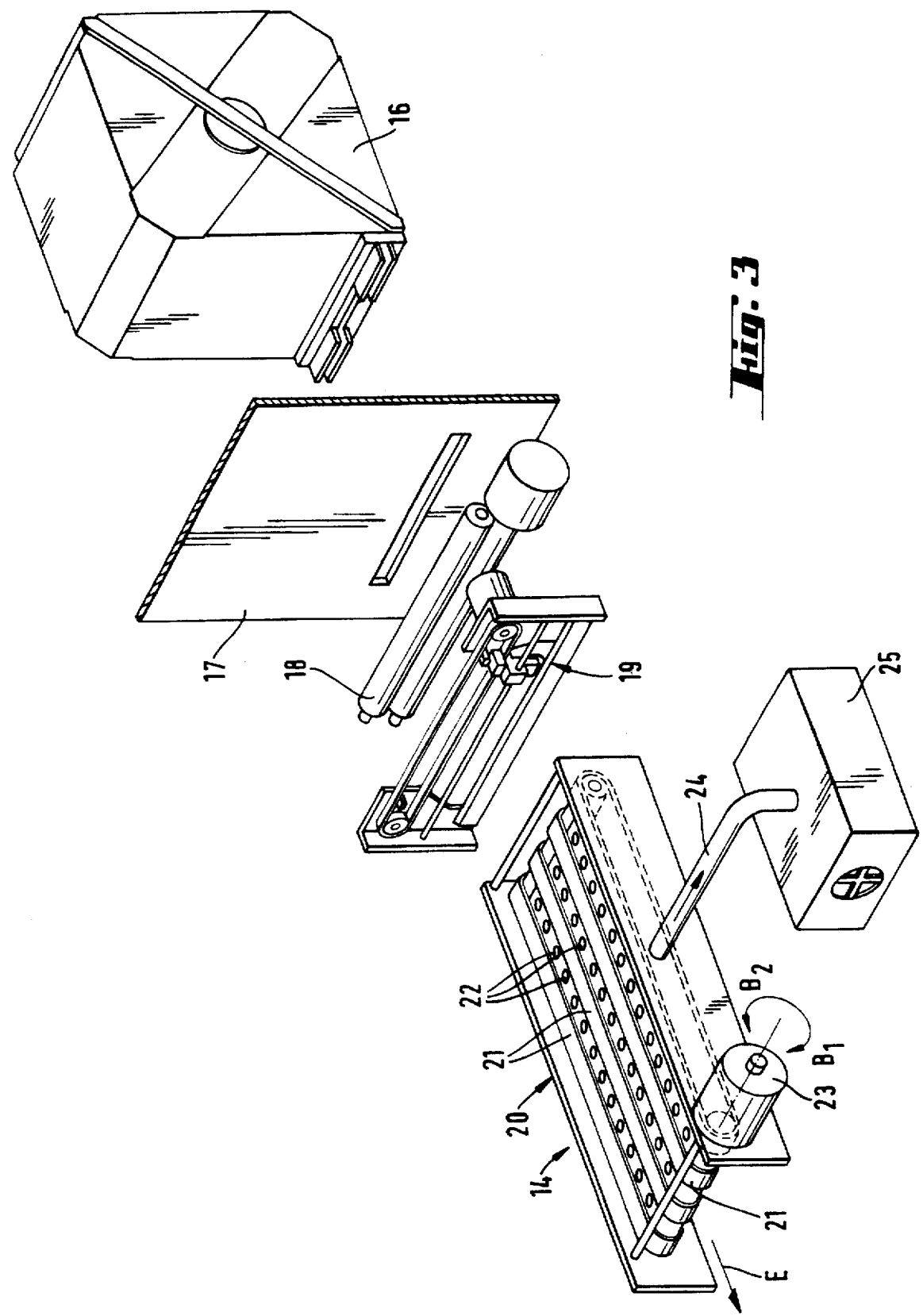

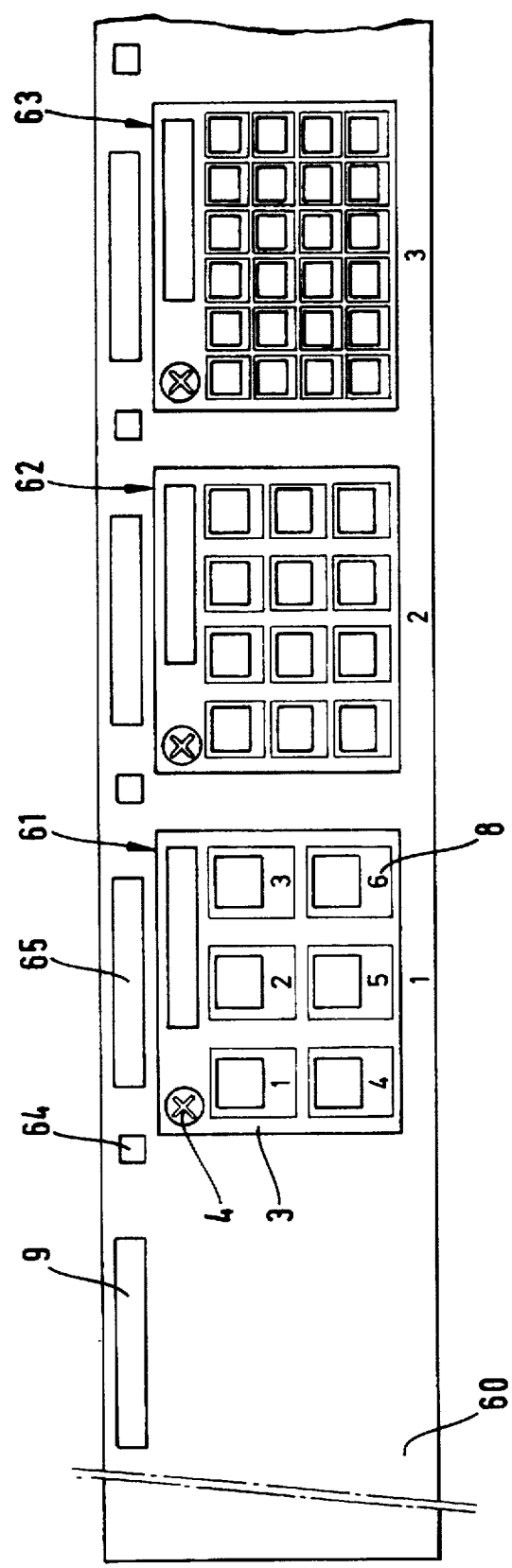

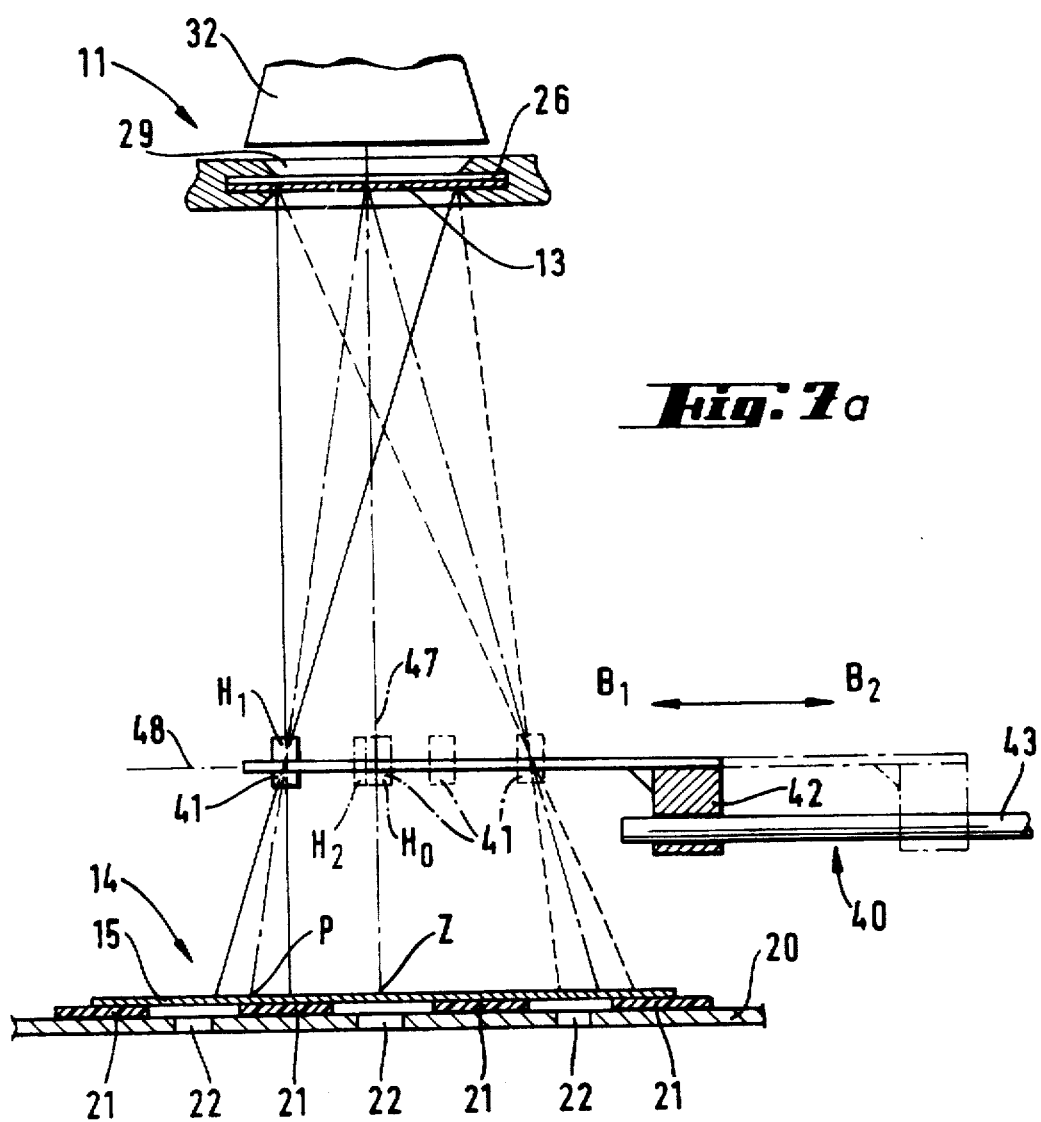

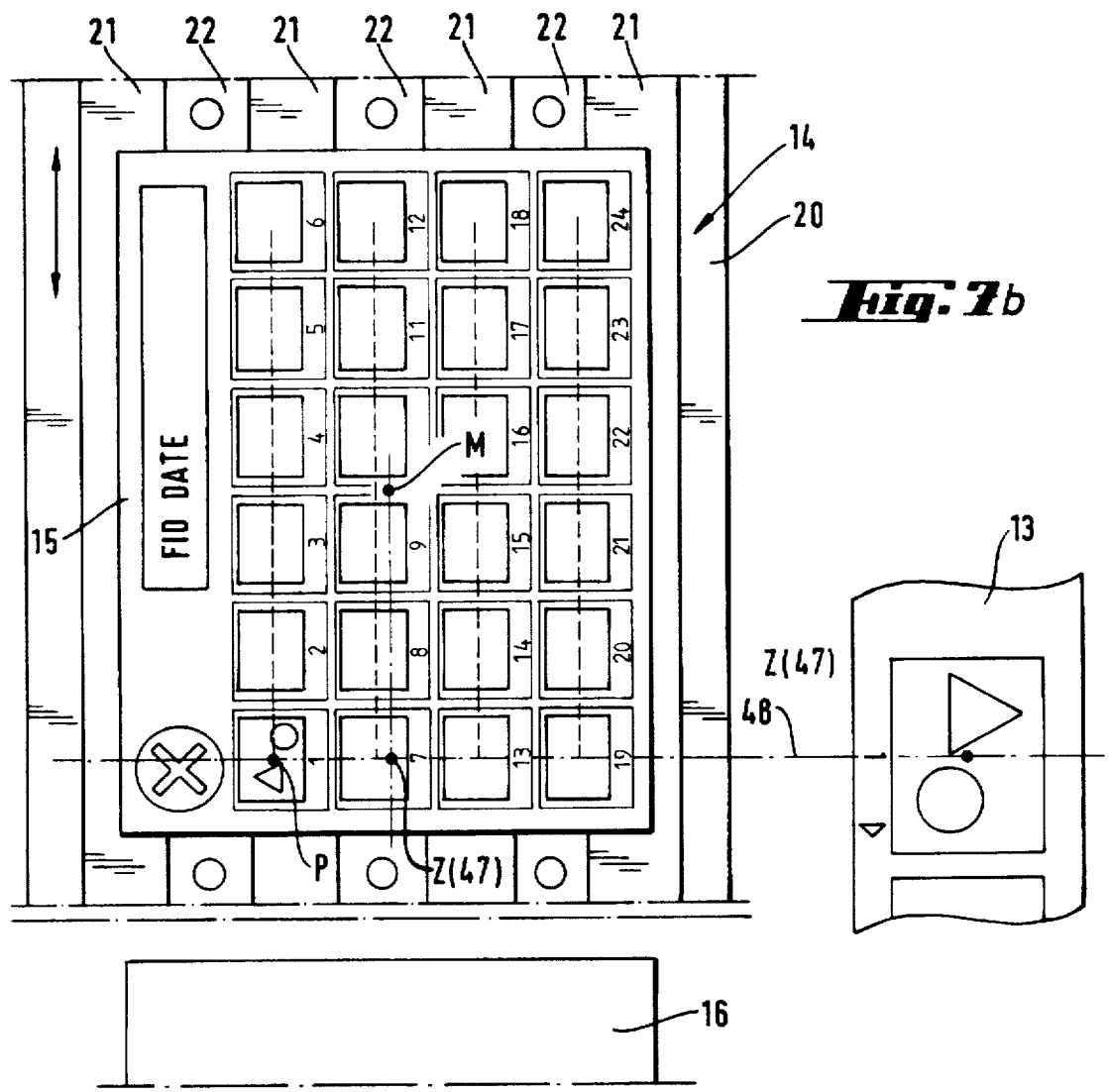

METHOD AND SYSTEM FOR CREATING INDEX PRINTS ON AND/OR WITH A PHOTOGRAPHIC PRINTER

BACKGROUND OF INVENTION

The invention relates to a method and a system for creating index prints on and/or with a photographic printer.

The present invention relates to photographic printers in general, and to procedures and equipment arrangements in particular, to create index prints on such printers in addition to the normal technical problem of enlarging photographic originals.

By definition, an index print is an individual paper print with a matrix of small images that correspond to separate negatives on a photographic film strip. Index prints fulfill a practical need for the amateur photographer, making it possible to inform oneself of the image content of a film strip by way of an intermediate stage of a positive print, without the film itself having to be observed and touched. This represents a major facilitation, particularly in connection with negative films, since it is difficult for the untrained user to assess the image content of color negatives because of the color reversal and the film mask.

Index prints became known recently through the popularization of video technology in the form of photo CDs. In this application, they represent a true index of the images contained on the photo CD. In this connection, an address on the CD is also associated with each image, in such a way that the image can be called up directly for presentation on a monitor. However, it is noteworthy in this connection that an index print has no direct relation to the original copy (negative film strip, slide, etc.).

Photographic printing labs typically do not work with index prints, even if the technology for this is available. Perhaps the need for index prints is not so pronounced in this case because the quality of cameras, photographic material and processing equipment in the photo lab has reached a state that already ensures a very high percentage of good pictures in the first run. In addition, for subsequent orders, particular aids have been developed that make possible an indisputable identification of those negatives of which further prints are desired.

However, individual processing labs offer so-called strip prints, also referred to as stock prints or proof prints. These are slightly enlarged (150%, for example) prints of the copy negatives contained on a film strip. They are created on special production printers or production printers that can be converted for this purpose, in the course of which the pertinent negative number is usually also printed at the same time. As the name indicates, strip prints are images on a narrow strip of paper, the paper being cut into strips according to a predetermined number of images in each case. Thus, in this case it is not actually a matter of an index print in matrix representation. The same is true for so-called sheet prints. In this instance, the developed film is cut into strips, each of which contains a number of negatives. Several of such strips are then laid side by side on a sheet of unexposed photographic paper and printed in contact printing. There is indeed a matrix-like structure in this case, but the paper format (A4, for example) deviates so considerably from that of the standard individual image enlargements that special equipment is necessary for the sheet print and production printers can no longer be used. In both cases, it is possible for the customer to order enlargements of only those negatives that he considers to be particularly successful or valuable. The additional expense for this two-phased procedure and its inherent tendency to reduce the size of the order make it easy to understand why index prints are hardly promoted by the labs.

In principle, there are two methods available as technology for creating index prints. In the first, the image fields on the negative film are printed by optical projection on full-scale or reduced scale onto photographic paper. As a rule, there are—aside from the different scale of enlargement—hardly any differences from the classic method of operation of a photographic printer.

In the second method, the technology presents itself markedly different. In this case, the copy negative is first broken up by an optical scanner into a large number of individual image points, which are in turn split into three colors, and are represented and stored as digital numerical values. From the thus stored image contents of a number of successive negatives of a film strip, prints combined in an index print are then created via a video printer of suitable construction (CRT-exposers, thermal printers, laser printers or the like).

Examples of this technology are found in U.S. Pat. No. 4,903,068 and U.S. Pat. No. 4,933,773 as well as in EP-A-0 543 233. In U.S. Pat. No. 4,903,068, to create the customer's print, the copy negative is scanned point-by-point with an unmodulated light spot of a B/W cathode ray tube and transferred in color sequence onto photographic paper by way of an enlarging lens and three suitably chosen color separation filters. During this procedure, part of the scanning beam is shifted, before the enlarging lens, by a partially reflecting mirror to a photoreceiver with suitable collecting lens. The thus created image signals are digitized and stored as a data record with three color density values for each negative. According to a predetermined number of negatives printed in each case, the stored image data are called up from the memory and electronically prepared into a combined video image with a corresponding number of reduced images; this video image can be represented on the cathode ray tube as negative B/W video image for one partial color at a time. This monitor image can be exposed as an index print on the next vacant place on the photographic paper. During this step, of course, the original copy negative can not be placed in the negative carrier.

In U.S. Pat. No. 4,933,773, a typical halogen bulb serves as light source for projection of the copy negative onto the photographic paper. The difference and advantage compared with U.S. Pat. No. 4,903,068 lies in the fact that all image points are transferred simultaneously and the exposure time is therefore shortened. To create an index print, part of the transferred image is reflected out in the direction of a video camera which records, separates by colors and digitally codes the image data. The corresponding data records for the printed negatives are filed in a first memory. From this memory, the data for, in each case, a group of N successive negatives in reduced form are transferred over into a second memory that groups them into a matrix with N elements. This image data can be represented after D/A conversion as a negative index print on a cathode ray tube and transferred onto the photographic paper by means of a set of color filters and a rotating mirror in the image-forming ray path of the printer. It can also be used, after running through a negative-positive converter, to be displayed as an index print on a color monitor.

The object of European Pat. EP-A-0 543 233 is a photographic printer in which the scanning station for analyzing the copy negatives and the printing station are separated. The data from the scanning station are fed to an exposure time calculator on the one hand, which controls the printing station, and on the other hand, to an index print generator that prepares the data of the individual negatives and stores them as a matrix. This matrix serves as a copy for creating an index print on a video printer. As an alternative, the index print can also be exposed onto the photographic paper of the photographic printer, if its light source is a cathode ray tube, i.e., allows a point-by-point image construction.

The above-mentioned, known solutions have the common feature that the index print, if it is to be created on photographic paper, is always exposed by means of a cathode ray tube on which the entire image matrix made of reduced individual images is represented.

U.S. Pat. No. 4,922,285 deals with a medical field of application, namely computer tomography. In this case, index prints are produced from tomograms. A cathode ray tube (CRT) which only represents one individual image, serves as a light source. This individual image is projected by means of a lens in reduced form onto photographic film, in the course of which the CRT and the lens structurally form a projection unit that can be mechanically displaced on a guide element crosswise to the conveyance direction of the film. A control system sees to it that after each exposure procedure, the projection unit is displaced a certain distance so that the reduced images come to lay crosswise side by side on the film. In the same way, the control system sees to it that the photographic film is displaced by means of a pair of conveyor rollers a certain distance in its longitudinal direction when a crosswise row is filled up with exposed image fields and a further crosswise row finds space on the film. The process is continued until the intended matrix of image fields is exposed on the film. The index print created is not a print but rather a negative. Furthermore, nothing is stated in the document concerning the coordination of numbers of the images on the index print with the original images on the cathode ray tube.

More recent developments in the field of photographic materials make it seem desirable in the future to also apply index prints in the field of normal amateur photography and the related photographic printing labs, i.e., without the detour via video technology. Decisive for this are, in particular, new film cartridges as described in U.S. Pat. No. 5,319,407, for example. These are characterized in that they not only receive the film until the development of the exposed film as with conventional cartridges, but in addition, after the processing procedures in the photographic lab are finished, they also serve as a storage container for the film. After that, the printed film goes from the finishing lab uncut in the cartridge back to the customer. The customer cannot take it out and observe it without special tools. The film is thus protected from finger prints and dust. Subsequent orders of individual images are possible if an enlargement of them exists that is marked with an image number that concurs with the one on the negative. However, it is simpler and more convenient for record-keeping purposes to send an index print back to the customer together with the developed film in the cartridge. Images of interest for subsequent ordering can be conveniently and reliably identified with the help of the image field numbers.

According to EP-A-0 588 331, moreover, narrower films in a width range of 15 to 30 mm can be expected, with preset image centers as in the older 126 format, but with a selection of height-width ratios (image height to image width) in the 1.4 to 3.0 range. The new films are splendidly suited to automatic processing, as they provide clear positioning aids and represent the image field numbers visually in bar-code and on a magnetic track.

SUMMARY OF INVENTION

It is an object of the invention, when creating prints from a negative film strip, to dispose, on photographic printers, index prints on which a number of successive negatives of the film strip are reproduced on full-scale or reduced image scale, together with the pertaining image field data, in particular the pertaining image field number. It is a further object to transfer the individual copy negatives, purely optically, onto the index print, using available light sources.

An additional object is directed to representing the partial images on the index print in the direction corresponding to the actual original (right-reading and upright).

Another object is to reproduce the individually corrected partial images of the index print with the same density corrections and color corrections that are used for the images of the production prints.

Another object lies in putting on the index print additional data that provide, for example, information on the name of the processing lab, date of processing, type of film printed, film identification number and the like.

A further object is to create so-called proof points (stock prints) that are in essence index prints but, in contrast to these, reproduce the copy negatives on a slightly enlarged scale and thus, as a rule, require larger paper formats, as are possible on certain types of mini-labs.

Yet another object is directed to creating index prints for slides on a printer for a reversal process.

A technical problem addressed by the invention is therefore essentially directed to providing a method, as well as a corresponding system, for creating index prints of a number of photographic printing copies. Exemplary embodiments can be executed on a photographic printer and achieved with relatively little equipment expense, in such a way that the corresponding system can also be executed relatively simply, making the greatest possible use of components already present in a typical photographic printer.

An exemplary method for solving this technical problem, according to the invention, and for creating index prints on a photographic printer can create index prints in a purely optical-photographic way. An exemplary method includes steps of:

scanning a copy film strip in a scanning station point-by-point and negative by negative, obtaining from the scanning signal density values for the exposure time determination in three partial colors and details on the image field number of the scanned negative and storing these data in a memory, while coordinating the three partial exposure times determined with the corresponding image field number;

exposing on photographic paper, on an enlarged scale and one after the other, all negatives of the copy film strip, using the determined exposure times; and in a further step, exposing a number of successive negatives of the film strip on full-scale or reduced scale in matrix form onto a single sheet of said photographic paper, during which:

the image field number associated with each negative is also exposed;

the exposure data stored during the initial scanning procedure are used as a basis for the exposure of the individual partial images;

in addition to the exposures of the negatives, further data in connection with the film strip are exposed, and whereupon the photographic paper is developed with the enlargements and the index prints.

An exemplary system according to the invention for creating index prints on a photographic printer can create the index prints in a purely optical-photographic way and can comprise a light-proof casing on and in which the following subassemblies are housed: a lamp housing with, for example, a halogen lamp as a light source; a negative carrier for receiving and conveying a copy film strip; a scanning station for point-by-point scanning of an image surface of negatives on the copy film strip and detection of their image field numbers and film-specific data; accompanying evaluation and storage electronics; an enlarging lens; an index print lens; a paper carrier for conveyance and positioning of the photographic paper; a supply magazine for the photographic paper; a further magazine for receiving the exposed paper, or a light-protected delivery station to a downstream paper developer; and a computer for coordination and control of the sequences.

An enlarging lens and index print lens can be provided which are interchangeable in the ray path and mutually exclusive in their use. Because of the smaller imaging scale, the index print lens is closer to the photographic paper than the enlarging lens. In contrast to the enlarging lens, the index print lens can be displaced in its active state crosswise to the conveyance direction of the photographic paper. When working with the paper feed control, this arrangement makes it possible to reproduce the negatives in matrix form on the photographic paper. As an alternative, a two-dimensional displacement ability of the index print lens can also be provided.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein:

FIG. 1b shows an index print associated with the standard print of FIG. 1a;

FIG. 2a shows a detail from FIG. 2 turned by 90 degrees;

FIG. 3 shows the paper-running subassembly of the mini-lab according to FIG. 2 in a more detailed exploded view;

FIG. 5 shows an index print film strip for use according to an exemplary method of the present invention;

FIG. 6b shows a top view of FIG. 6a;

FIG. 7a shows details for reduced exposure of negatives onto the fields of the index print matrix in accordance with an exemplary embodiment;

FIG. 7b shows a top view of FIG. 7a;

DETAILED DESCRIPTION OF THE PREFERRED EMBODIMENTS

In the following description of a preferred embodiments using the drawings, identical or functionally equivalent parts are provided with the same reference numbers. For the sake of simplicity and easier understanding, the invention is described with reference to the printer section of a mini-lab for negative films. However, the invention is not so limited, and can for example, also apply analogously to roll printers and equipment for processing reversal films as well as framed slides. Furthermore, the following description deals essentially with the aspects and equipment components that are new in relation to the state of the art, and it is assumed that one skilled in the art is familiar with modern, computer-controlled printers and corresponding production methods for photographic prints and needs no further explanation. Typical examples for modern photographic printers are described, among others, in the initially cited documents and, for example, also in U.S. Pat. No. 4,951,084, U.S. Pat. No. 5,016,043, U.S. Pat. No. 5,036,351, U.S. Pat. No. 5,041,869, U.S. Pat. No. 5,119,125, U.S. Pat. No. 5,164,765 and U.S. Pat. No. 5,309,199, the disclosures of which are hereby incorporated by reference in their entireties.

Furthermore, for the sake of easier understanding, in the following description, a normal case is assumed in which individual image field data that are associated with the individual images of an index print are the image field numbers that are typically present on the film strip and/or the printing copies and are scanned from them and stored. The invention is not limited to such image field numbers, however. For example, one can also use as image field data other image-related image field identification data which, for example, are generated individually during production of the index prints or are pre-established in any suitable manner. The type of image-related image field identification data provided can, for example, also be selected dependent on film-related and/or image-field-related additional data present on the film strip and scanned from it.

Figure 1A:
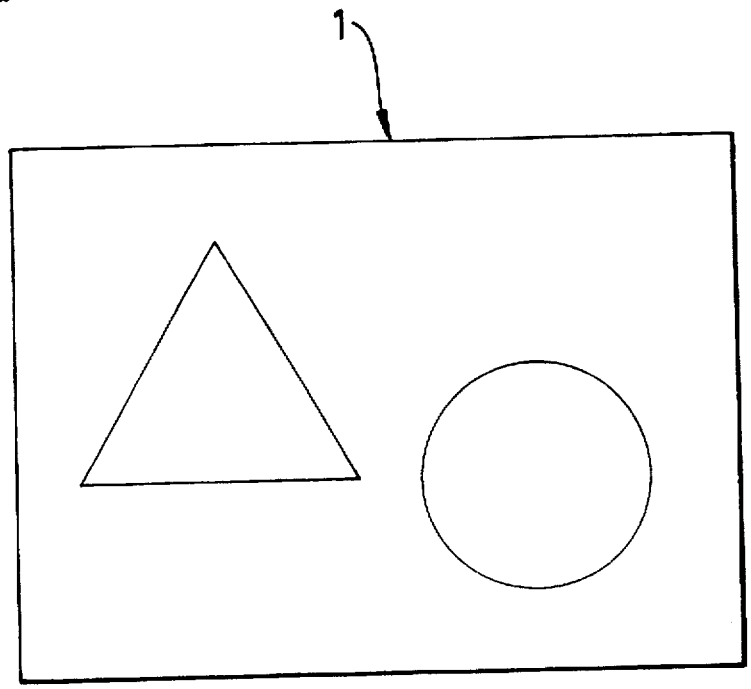
FIG. 1a shows a typical standard copy (standard print)
Figure 1B:
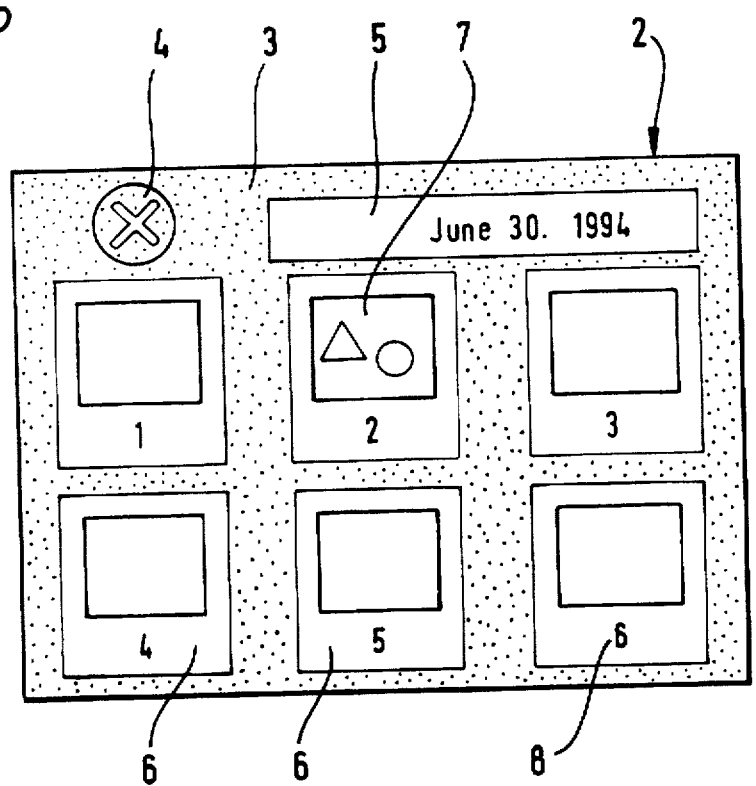

FIG. 1a shows an example of a normal photographic print (enlargement, standard print), and FIG. 1b shows an example of an index print associated with the normal print (standard print) of FIG. 1a, in accordance with an exemplary embodiment of the invention. A single subject is represented in the standard print 1. Index print 2 contains a matrix of several subjects in reduced representation. In an exemplary frame 3 that remains unchanged for all index prints of the same paper format, space is provided for a logo 4 of the processing lab, and also a field 5 for data that are dependent on the customer order (for example, film identification number, FID) or are otherwise variable (for example, date). In recesses 6 of the frame 3, arranged by lines and columns in matrix form, there is space for the reduced index images 7 as well as the pertaining image field numbers 8. In the process, the number of index images and/or elements of the matrix can be determined by the dimensions of the paper print, the purpose and the required interpretability of the photographic information. It can range from a few to all of the images contained on a film strip.

Figure 2:
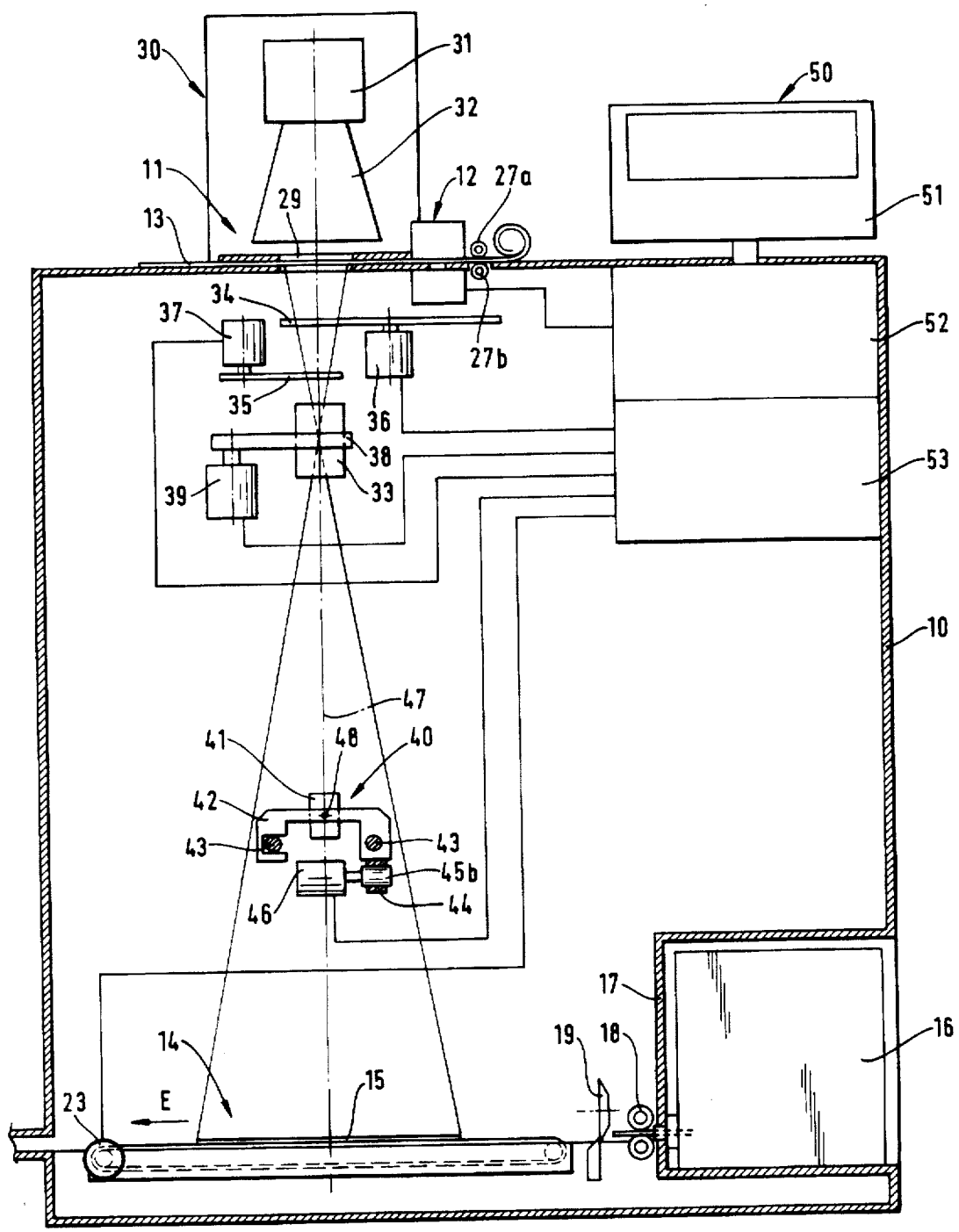
FIG. 2 shows an illustrative diagram of a printer section of a mini-lab according to an exemplary embodiment of the invention.

FIG. 2 represents the printer section of a mini-lab which, as is well known, by definition combines film development, photographic exposure and paper development in one apparatus and, in accordance with exemplary embodiments of the present invention, can create index prints in addition to standard prints. A negative carrier 11 with accompanying scanning station 12 for receiving a film strip 13 is arranged in a casing 10. A paper carrier 14 is provided as part of a paper-conveying group for receiving a single sheet of photographic paper 15 from a paper cartridge 16. The cartridge is docked at a base plate 17. A pair of rollers 18 conveys the photographic paper onto the paper carrier. A rotary cutter 19 cuts it to the required sheet length.

FIG. 3 shows an exemplary embodiment of the paper-conveying group in exploded view for better understanding. In particular, the paper carrier 14 is shown in greater detail.

It comprises a vacuum chamber 20 that has, at its top, conveyor belts 21 between tracks of punched holes 22 to the chamber interior. The conveyor belts 21 are driven jointly by a reversible step motor 23. The vacuum chamber 20 is connected via a tube 24 with a vacuum pump 25 which creates a slight low-pressure (that is, vacuum) in the chamber to secure the photographic paper in place.

FIG. 2 and FIG. 2a further show a projection system 30 which includes a light source 31, a light shield 32 and a projection lens 33. To color the printing light, there is a color filter wheel 34 with a filter assembly that can, in an exemplary embodiment, include at least the three primary filters: red, blue and green. A shutter 35 (or a special dark position of the filter wheel) serves to block and release the optical ray path. These elements are driven by motors 36 and 37, respectively. The projection system projects in each case a negative of the film strip 13 onto the unexposed photographic paper 15. The enlargement lens 33 is attached on a swivel arm 38 or a lens carrousel, which sits on the shaft of a motor 39 and can swing the lens 33 completely out of the ray space that is formed by the image-forming rays between a negative on the film strip in negative carrier 11 and the photographic paper 15.

An index print subassembly 40 is provided with an index print lens (IP lens) 41 for exposure of the index prints. The IP lens sits on a conveyor carriage 42 which is in turn mounted on a pair of guide rails 43. The carriage 42 can be driven by a toothed belt or tow-cable 44 (FIG. 2a) that runs over a pair of rollers 45 a,b. A motor 46 is connected via its shaft with the drive roller 45b. If necessary, it can bring the IP lens into the image-forming ray path, i.e., into the area of the optical axis 47. This axis is determined by the connecting line between the symmetrical center of a negative mask in the negative carrier 11 and the focal-point of the projection lens 33.

In FIG. 2a, the index subassembly 40 is represented separately and, for the sake of clarity, illustrated from a point of view 90 degrees around the optical axis 47 of FIG. 2. In reality, the moving direction of the IP lens, according to the FIG. 2 embodiment, runs at right angles to the conveyance direction of the photographic paper 15.

Attached on and in the casing 10 is an electronic subassembly 50 for operating and controlling the apparatus; namely, a keyboard and display field 51, an evaluation and storage unit 52 for computing the exposure time and determining the image field numbers, as well as a computer 53 for controlling the sequences.

The method of operation of this printer will now be described in detail. It is assumed for purposes of the following discussion that the developed films are present as individual films (e.g., film strip) and are inserted and removed by hand, and that the photographic paper is cut into single sheets in each case immediately before exposure and is then developed using the generally known single-sheet procedure. In addition, the individual negatives of a specific film strip are first to be enlarged, then an index print is to be prepared from the entire film strip. The paper format is predetermined, as is the film format. The projection lens 33 and the index print lens 41 are designed, in generally known manner, as zoom or interchangeable lenses to allow for different paper formats and index prints with different numbers of images.

Figure 4:
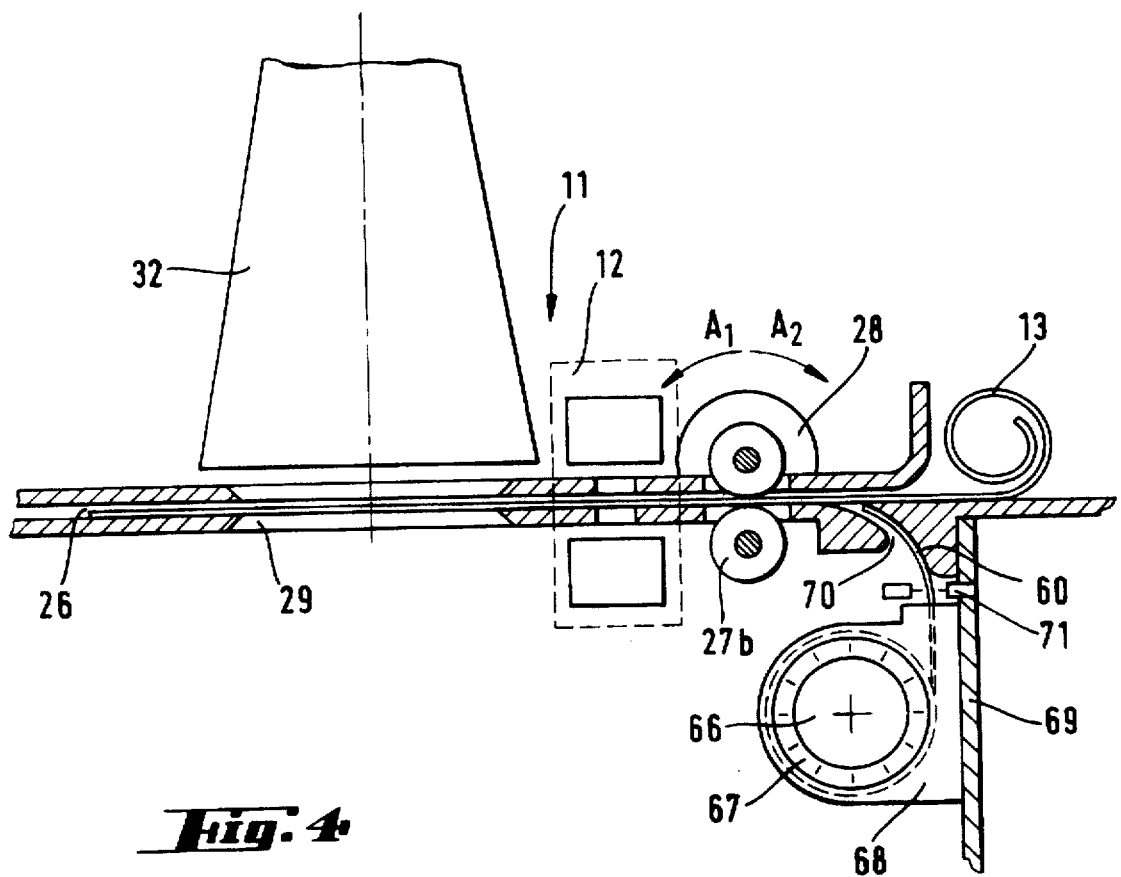
FIG. 4 shows the paper-running subassembly of the mini-lab according to FIG. 2 as a more detailed diagram.

With the help of FIG. 4, details of an exemplary negative carrier 11 are explained.

A film channel 26 serves as a guide for the film strip 13. A pair of conveyor rollers 27a,b, driven by a reversible step motor 28 convey the film at uniform speed through the film channel. The sequence is as follows. On the basis of a start command, the step motor 28 begins rotating in the direction of rotation $A_2$. The film strip 13 is inserted into the film channel 26 on the right of FIG. 4 in the negative carrier 11 and, in the process, is grasped by the conveyor rollers 27a,b that bring about further conveyance. In the process, the film strip leader area first runs through the scanning station 12 and then the printing window 29. Assuming that the film leader area contains film-specific data, such as the film identification number (FID) and the number of image fields in, for example, bar-code form (9 in FIG. 5), these data are detected in the scanning station 12 and stored in the evaluation station 52. The scanning station 12 can, for example, include a linear photocell array for density analysis of image content and a bar-code reader for the data in a margin track of the negative (e.g., FID and image field numbers) as well as a sensor for detecting markings on the film strip that define the precise position of each individual image field. During conveyance of the film, these markings are detected by the scanning station and their signals are evaluated by the electronics in order to stop conveyance as soon as a negative is positioned, ready for printing, in the window of the negative carrier. In the sequence shown, this is the case for negative no. 1 the first time. During the uniform passage of the negative through the scanning station 12, the exposure times for the positioned negative were calculated in the evaluation station 52 from the measured density data and filed in the accompanying memory. The data decoded from the DX code in the margin track of the negative, such as film type and image field number, were also stored in the same place.

In the meantime, the drive rollers 18 of the FIG. 3 carrier 11 have fed unexposed photographic paper from the paper cartridge 16 under the cutter 19 onto the paper carrier 14. In the process, the feed length is determined via the number of steps of the drive motor and when the target length is reached, the paper is cut by the cutter 19. The vacuum in the vacuum chamber 20 of the paper carrier 14 is activated during this time. The vacuum holds the cut sheet of photographic paper firmly on the conveyor belts, while the step motor 23 rotates in the direction of rotation $B_2$, until the sheet is centered under the optical axis.

In the next operation, the exposure is triggered. It runs in multiple phases, in that on the basis of the determined exposure times stored in station 52 of FIG. 2, the shutter 35 releases the path of rays by swinging out of its rest position, while the filter wheel 34 swivels three color filters (R,G,B), one after the other, into the path of rays for the duration of the respective calculated exposure time. At the end of the exposure, the shutter 35 goes back into its blocking, rest position. The exposed sheet of photographic paper 15 is then carried away to the paper developing section (not shown), in the direction of arrow E (FIG. 2). Consequently, a new conveyance and exposure cycle can be started. The pair of drive rollers 18 sends in from the paper cartridge 16 a corresponding length of new photographic paper which is cut by the cutter 19. The film strip 13 is conveyed up to the next negative (no. 2) and analyzed in the process. The subsequent exposure ends this second cycle. The process is repeated automatically until the entire film strip is printed. After exposure of the last negative in the film strip, the film conveyance pushes the film strip completely out of the negative carrier, and the paper conveyance delivers the last exposed sheet of photographic paper to the developing station.

The next technical problem relates to creating the index print for this film strip. In the first step, for this purpose, the frame 3 of FIG. 1b is exposed with the logo 4. For this, a copy negative is required in the negative carrier. According to the exemplary embodiment of FIG. 4, this copy negative can use the same guiding and conveyance elements as were used for the film strip. The film guiding channel 26 is free of film strip 13 after the preceding operations. It can therefore temporarily receive a special index print film strip (IP film strip) 60 which coincides in format and type with the strip 13, but which includes only a few image fields 61,62,63 as shown in FIG. 5. These image fields correspond to the frames 3 with logo 4 and image field numbers 8 of the index print 2. Any matrix fields with a different number of elements can be coordinated with the various commercially available film lengths. Referring to FIG. 4, the IP film strip is included in a special film cartridge 68 driven by a step motor 66 via a magnetic coupling 67; this cartridge can be attached on a plate 69 under the negative carrier 11. The film strip 60 has a rest position in a guide channel 70; the rest position is monitored by a photoelectric barrier 71.

In a first step for exposure of the index print, the IP film strip 60 is pushed by the motor 66, with magnetic coupling 67 switched on, out of the guide channel 70 into the guide channel 26 and, in the process, is grasped by the conveyor rollers 27a,b that are set in rotation at the same time and that take over the further conveyance while the magnetic coupling 67 is switched off and the motor 67 is stopped. The position number of the negative running through the channel 26 is detected in the scanning station 12. This position number is associated with a specific film length which is compared in the evaluation station 52 with the stored length of the previously printed film strip. If the two lengths concur, the corresponding frame (e.g., frame 62 of FIG. 5) is positioned in the printing window of the negative carrier.

Simultaneously with these actions, the paper conveyance has triggered a photographic paper feed, fed the photographic paper forward by one sheet length and cut it, and positioned the sheet on the paper carrier symmetrically with respect to the optical axis. Then, after all necessary elements (negative, projection lens and unexposed photographic paper) are in the proper position, the frame can be exposed with predetermined color and exposure time. The pertaining parameters are taken from the memory 52. In an exemplary embodiment, the frame includes, besides the image matrix with the image field numbers, the company logo. After completion of the exposure, the magnetic coupling 67 and the step motor 66 switch back on and pull the IP film strip 60 back into its rest position. During this procedure, the conveyor rollers 27a,b must be separated far enough from each other that the film strip can pass between them without touching. This separation can take place via magnets or motors (not shown) in connection with mechanical elements.

Figure 6A:
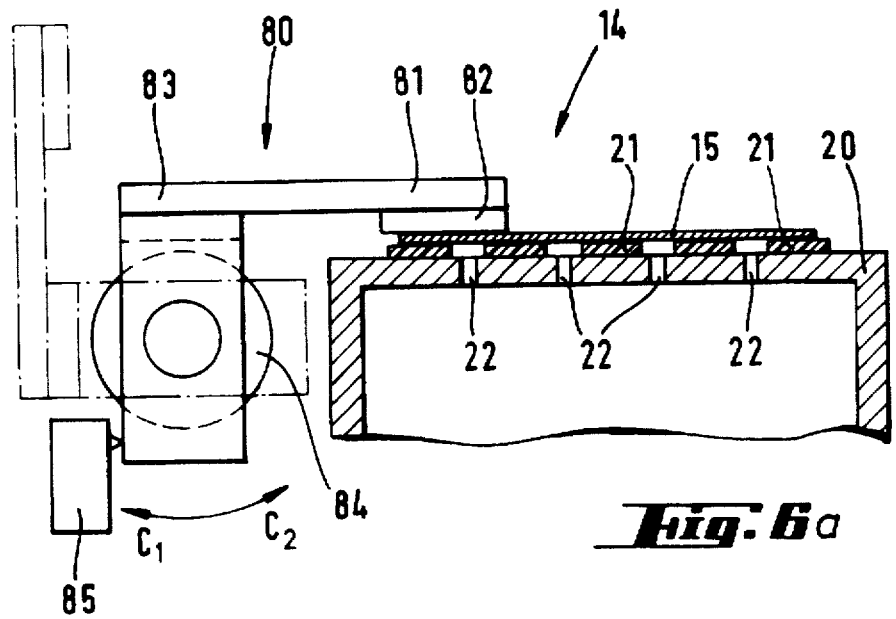
FIG. 6a shows an exemplary embodiment for exposure of variable data onto the index print in diagram form.
Figure 6B:
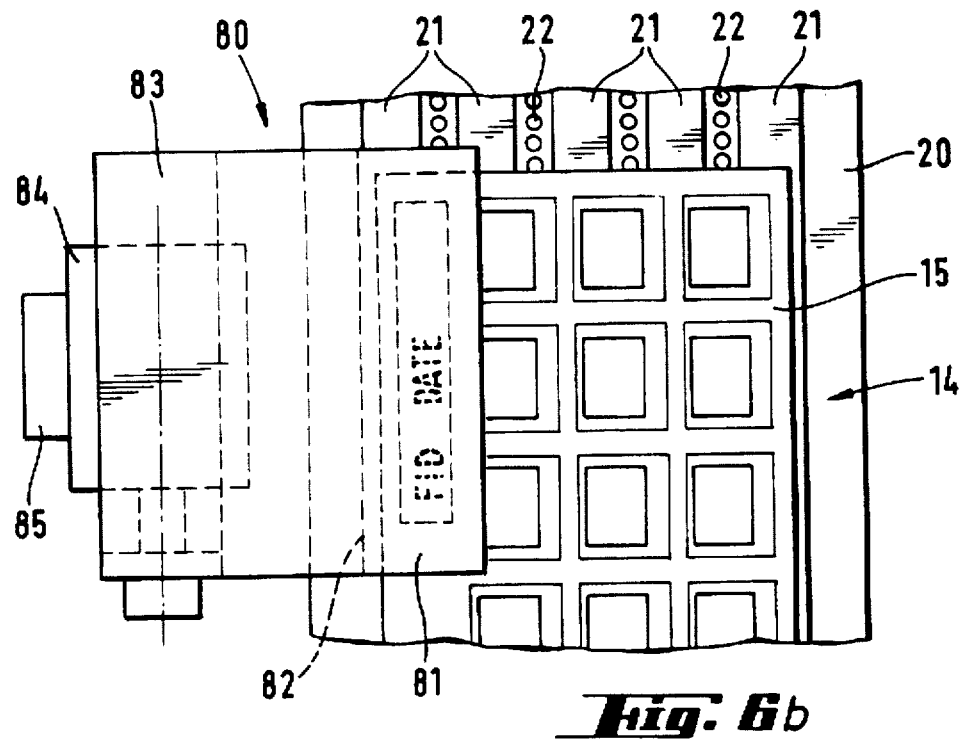

In the next step, the variable data, film identification number (FID) and date, for example, are exposed. In an exemplary embodiment, these data can be displayed by means of an LCD (liquid crystal display) matrix and contact exposure of the data onto the photographic paper. As an alternate embodiment, the LCD matrix can be reflected into the optical ray path and reproduced by the IP lens 41 at a recessed location of the frame on the photographic paper. Instead of the LCD matrix, an LED (light-emitting diode) matrix, a miniature cathode ray tube or the like can also be used as a display and exposure medium. An exemplary embodiment which includes an LCD matrix and contact exposure is illustrated in FIGS. 6a and 6b. The photographic paper 15 rests on stationary conveyor belts 21 and is fixed on them by the relatively low-pressure of the vacuum chamber 20. An exposure subassembly 80 includes a support plate 81 for the LCD matrix 82, a holding clamp 83 for the support plate 81, a reversible step motor 84 and a limit switch 85. The holding clamp 83 is rigidly connected with the shaft of the step motor 84. In a rest position (drawn in broken lines in FIG. 6a), the support plate is held in a vertical position outside of the image-forming ray path of the projection system. For exposing the variable index print data, first the support plate 81 is swiveled 90 degrees while the motor 84 is started in direction of rotation $C_1$, until the limit switch 85 indicates the proper position of the LCD matrix 82 on the photographic paper. Henceforth, the LCD matrix can be activated. The required data and exposure time information, as illustrated in FIG. 6b, is retrieved from the memory 52. After the exposure phase, the LCD matrix 82 is once again deactivated. The support plate 81 with the matrix then swings back into its rest position. In this connection, the final position can be established via a predetermined number of steps of the motor 84, the exact rest position of the LCD matrix not being critical. This partial exposure task is consequently completed.

Next, reduced images of the negatives of the order film strip 13 are transferred onto the index print matrix. For this purpose, several preparation tasks are implemented and preconditions are first created in the image-forming system. Further, the FIG. 2 projection lens 33 is swung out of the ray path by a swivel motion of 90 degrees, for example, or only as much as necessary in order not to interfere with the exposure of the index prints. The index print lens 41 can henceforth be moved into the optical axis.

Then, the photographic paper is brought into printing position for the first element of the matrix. Referring to FIG. 7, because the IP lens 41 can, in an exemplary embodiment, move only on one plane 48 that is determined by the optical axis 47 and a perpendicular to the conveyance axis of the photographic paper, the focal point P of the matrix image no. 1 must come to be situated on this plane. The relations are illustrated in more detail in FIG. 7. For the exposure of the frame and the variable information, the focal point M of the photographic paper was situated at the intersection point Z of the optical axis and the paper carrier (FIG. 7b). The photographic paper must accordingly be further conveyed by the distance from M–Z. For this purpose, the drive motor 23 (FIG. 3) drives the conveyor belts 21 in the extended (forward) direction, while the photographic paper is secured slip-free on them via the vacuum chamber 20. Furthermore, the IP lens 41 is brought out of its previous position on the optical axis (Point $H_0$ in FIG. 7a) into the new position $H_1$ which can be exactly calculated on the basis of optical principles and stored in the memory 52 as a parameter for the drive of the lens carriage 42. Finally, the order film 13 is positioned in the negative carrier, during which one must make sure that image field no. 1 is situated in the printing window. The first image of the matrix can henceforth be exposed. The exposure data for this procedure are filed in the evaluation and storage station 52 from the first passage of the film strip. This data is modified by the computer to allow for the modified imaging scale. Time can be saved by dispensing with the renewed analysis of the image. In addition, the index print shows precisely the same density and color propensity as the prints of the first run.

After the first negative has been printed, the photographic paper 15 can be conveyed far enough backward that the focal point of matrix element no. 2 falls onto the plane 48 intersecting the optical axis. The IP lens 41 can maintain its position for the time being, but the film strip 13 can be conveyed forward by one negative length, i.e., to no. 2. After the conveyances are completed, the exposure of image field no. 2 can be carried out. The process is then repeated until the last position of the first matrix line is reached on the photographic paper. Next, the first element of the second matrix line is exposed. For this purpose, the IP lens 41 is first shifted and the photographic paper 15 is advanced into the position it held beforehand for the exposure of image field no. 1. Henceforth, the exposure of the image fields of the second matrix line can begin. The process is continued until finally the entire film strip is printed and all matrix elements are exposed. With that, the multi-phase exposure of the index print is concluded. The film strip can be taken out of the negative carrier and the photographic paper can be fed to the developer. The printer is thereby free for processing the next film strip.

In practice, various deviations from the described exemplary embodiments are possible. They can lead to more expedient sequences or improved capacity.

In the field of film conveyance, for example, one of the following exemplary possibilities can be chosen (listing is not definitive):

1) Standard prints in forward operation, IP prints in reverse operation: The film strip is inserted only once; the sequence for the exposure of the matrix fields can be changed.
2) Index prints in forward operation, standard prints in reverse operation: In this case as well, the film strip is inserted only once; the index print is exposed in ascending order of the image fields.
3) At first a pure scanning run forward, then standard prints in reverse operation, finally IP prints in forward operation.
4) Scanning forward, index prints in reverse, standard prints forward.

The scanning of all image fields in the scanning run makes possible a comparison of the various negative data records and thereby, for example, the equalization of extreme density jumps or the maintaining of the color balance between subjects that were shot under similar conditions; this leads collectively to an improvement of image quality.

As an exception concerning the preceding variant 3), the renunciation of standard prints and/or the production of the index prints independent of the production of the standard prints can be selected, with the IP prints being selectively created by choice in the forward or reverse operation of the film strip. This variant is used, for example, for creating stock prints (proof prints). In the process, the selection of the standard prints (for example, in a large format) can be made later on the basis of the assessment of the proof prints, and the printing procedure can also be based on a separate scanning procedure of the negatives, i.e., one does not necessarily have to fall back on the scanning values determined when producing the index prints. Larger formats are usually requested for the proof prints, and the individual images of the matrix can thus be slightly enlarged compared to the negative. An index print can thus comprise a matrix with only a few elements in this case of application. For this reason, several index prints will belong to a film strip, as a rule. Of course, in this method variant, the index prints can also be formed in 1:1 or in any other desired format.

There are special conditions when the method for creating index prints according to the invention can be executed on a production printer, which, as is well known, represents a pure exposure machine without film and paper development. In this case, as a rule, a number of films are spliced together into a long strip on a film roll, and they are essentially conveyed in one direction. The strategy can include printing all standard prints of the negatives on the film roll in a first run, whereby the exposure-specific and film-specific data of each negative remain deposited in the evaluation and storage unit. If the films processed are, for example, of the 135 format, for clear identification of the film, the FID number can be replaced by the so-called twin check number, which represents essentially none other than a lab-internal, continuous number for each film spliced (cf., for example, U.S. Pat. No. 4,574,692). On the basis of these data, the corresponding index print for each film can then be provided in a second run of the film strip. In this case as well, the production of index prints can take place independent of the production of the standard prints and/or the latter can be dropped, i.e., in such a way that only index prints are created. Of course, the production of the standard prints can be based on a separate scanning procedure in this case as well.

The index print film does not necessarily have to be guided in the guiding mechanisms of the normal film strip. Namely, it is also possible to fix individual negatives with the corresponding masks in a flat frame that is mounted on a carriage similar to the IP lens and, like the IP lens, can be moved crosswise to the conveyance direction of the photographic paper into and out of the ray path by means of a step motor. Ideally, in the process, the IP negative can be situated on the plane of the normal film guiding mechanism and thus cross it. Because of the considerable depth focus of the IP lens, however, a certain deviation for constructive reasons is permissible.

Figure 8:
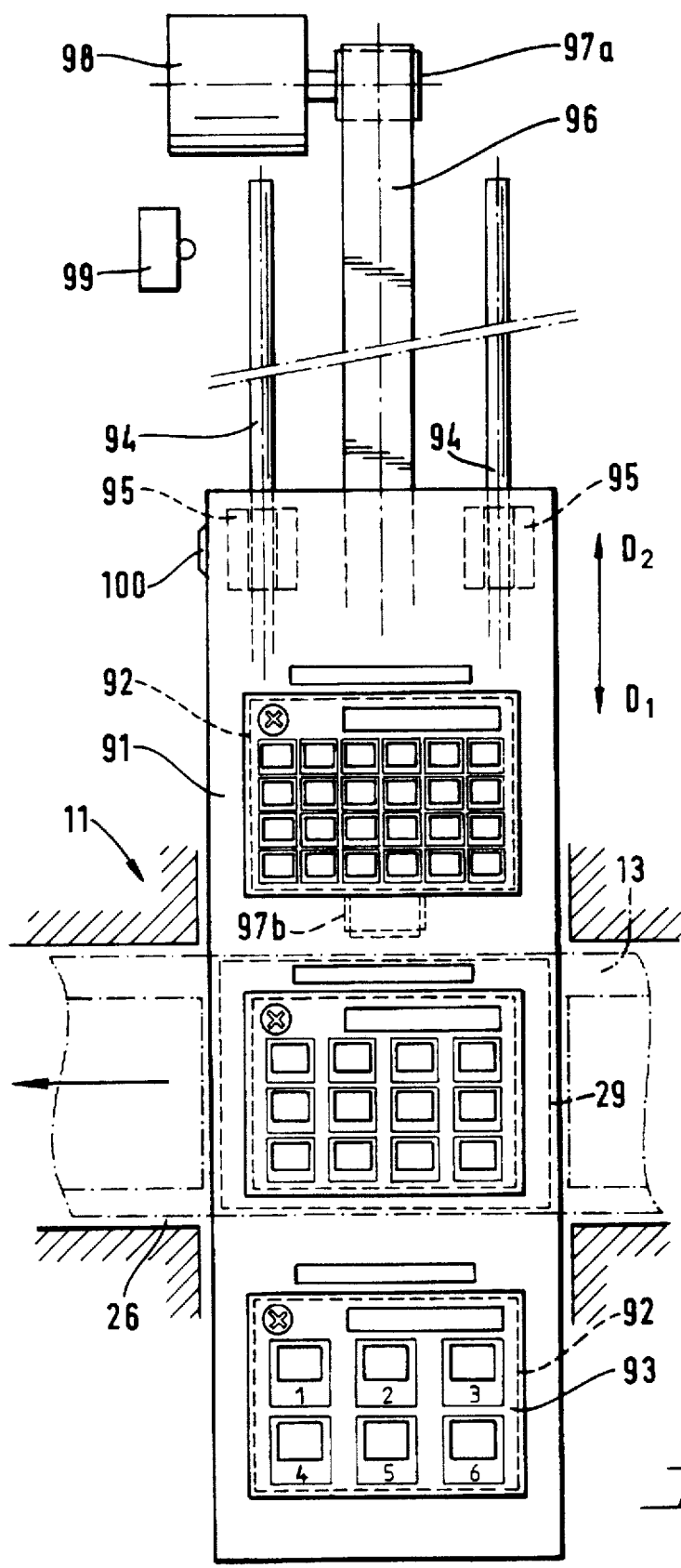
FIG. 8 shows an alternate exemplary embodiment for the positioning of index print negatives with image frames.

FIG. 8 illustrates such an embodiment in diagram form. A support frame 91 has openings 92 that are covered by IP negatives 93 stuck thereon. The support frame runs on a pair of rails 94 with which it is connected via guide sleeves 95. It is also connected with a toothed-belt 96 that runs over a pair of rollers 97a,b and is driven by a step motor 98. In its operating position, the support frame crosses the film guiding mechanism for the film strip 13, which is not shown in FIG. 8. It has a rest position outside of the film guiding mechanism. The rest position is determined by a limit switch 99 acting together with a bump 100 on the support frame. The desired IP negative can be positioned by counting the conveyance steps from this rest position.

The image frame does not necessarily have to be projected as an enlargement from a negative. In principle, it can also be laid as a contact negative in full size in a vice onto the photographic paper and illuminated through the film-free printing window in the negative carrier by the normal light source (halogen bulb) through the FIG. 2 projection lens 33.

Thus far, it has been assumed that with the exposure of the image frame for the index print, also the image field numbers are imprinted into the elements of the matrix. This is not absolutely necessary. Rather, the image field numbers, which are arranged below each negative in the usual 135 film format, can also be optically transferred along with the image. In the process, however, with considerable reduction, the limit of readability is soon reached. In addition, the printing window 29 in the negative carrier can include, for example, a cut-out that releases the image number for projection.

If one wishes, the image field numbers can also be handled like variable data and taken from the data records for the negatives. Because they are spread over the entire image field, they can be represented by a self-luminous or illuminable display, for example an LCD matrix, an LED matrix or a cathode ray tube, and reflected via an optical system onto the film plane near the copy window. By briefly activating or switching on the illumination of the display, these data can then be exposed onto the paper together with the exposure of the index print via the same lens. If necessary, these data can also be exposed in contact by a (relatively large and accordingly expensive) LCD or LED matrix. On this occasion, the remaining variable data (e.g., FID number, date) should be transferred.

Figure 12:
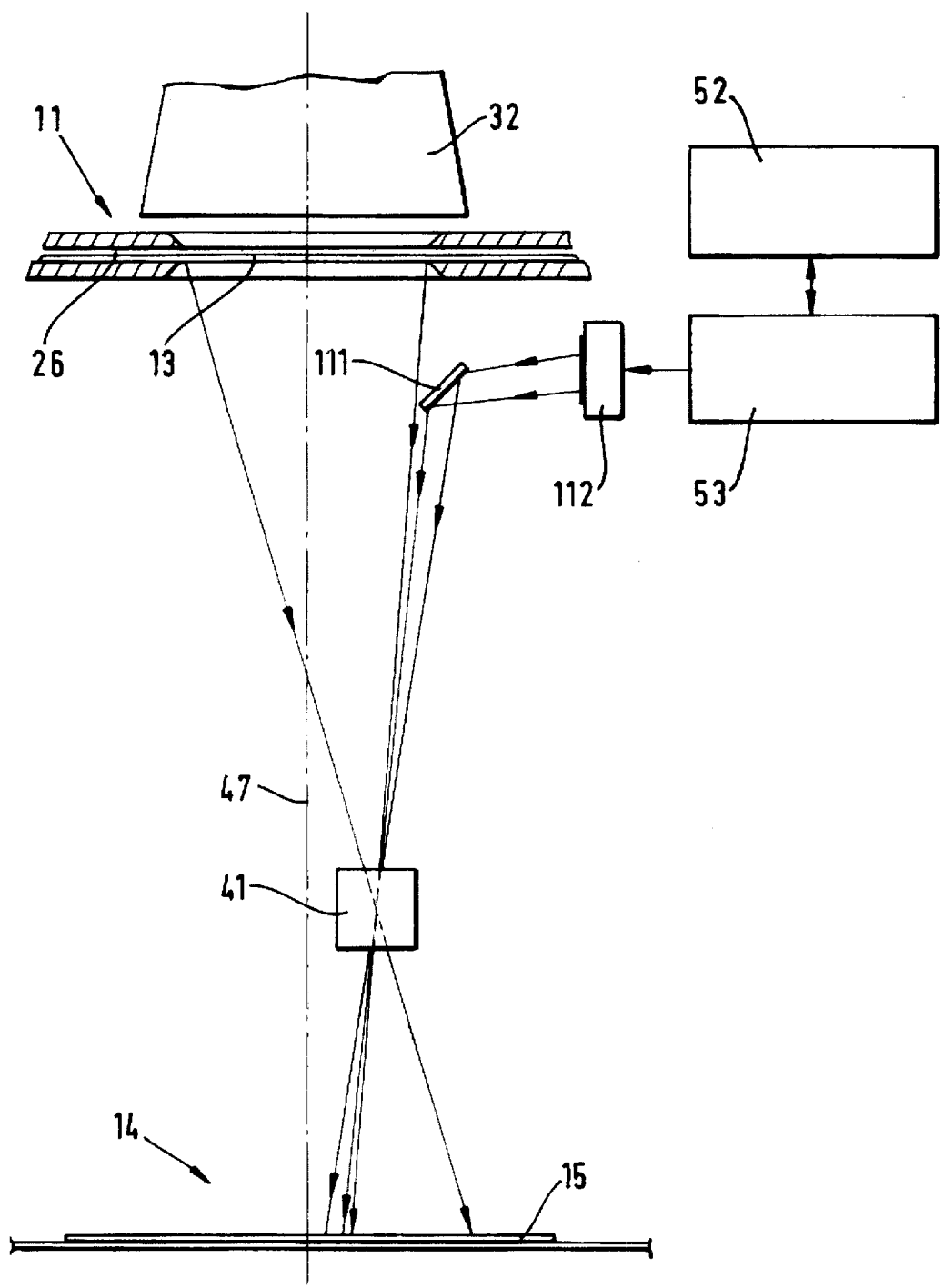
FIG. 12 shows a further advantageous embodiment for imprinting and/or exposing image field numbers and variable data into and/or onto the index print.

FIG. 12 shows how the fading-in of the image field numbers can be carried out by means of a self-luminous display. Relatively near the conveyance plane of the film strip 13, a small reflecting mirror 111 is arranged somewhat outside the normal image-forming ray path; this mirror reflects the light coming from a self-luminous LCD display 112 onto the photographic paper 15. The display 112 is attached, in basically familiar manner, to the computer 53 and the memory 52 connected with the computer, and is controlled by the computer for representing the respective associated image field numbers.

Figure 9:
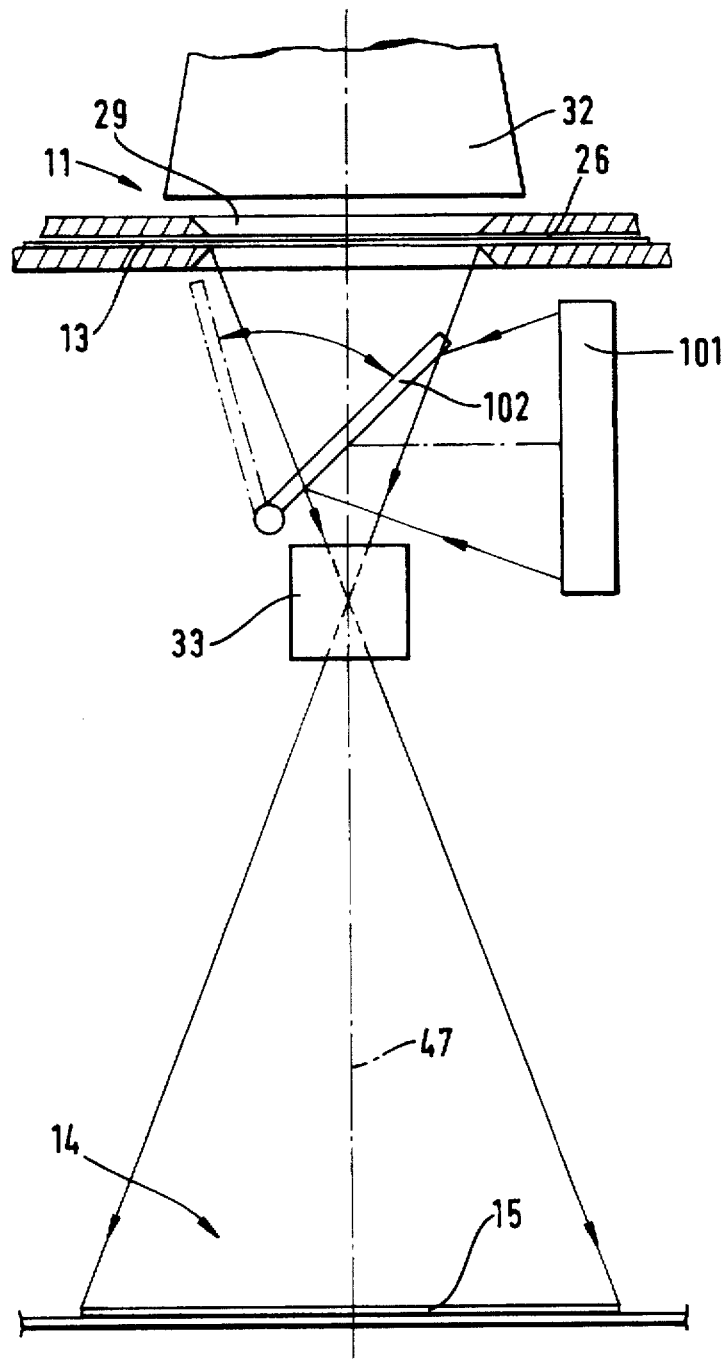
FIG. 9 shows an exemplary embodiment for imprinting image field numbers and variable data into the frame.

FIG. 9 shows a variant embodiment with an LCD matrix 101 and a rotating mirror 102. Because the entire photographic paper is to be illuminated, the enlarging lens 33 can be used for the projection.

Figure 10:
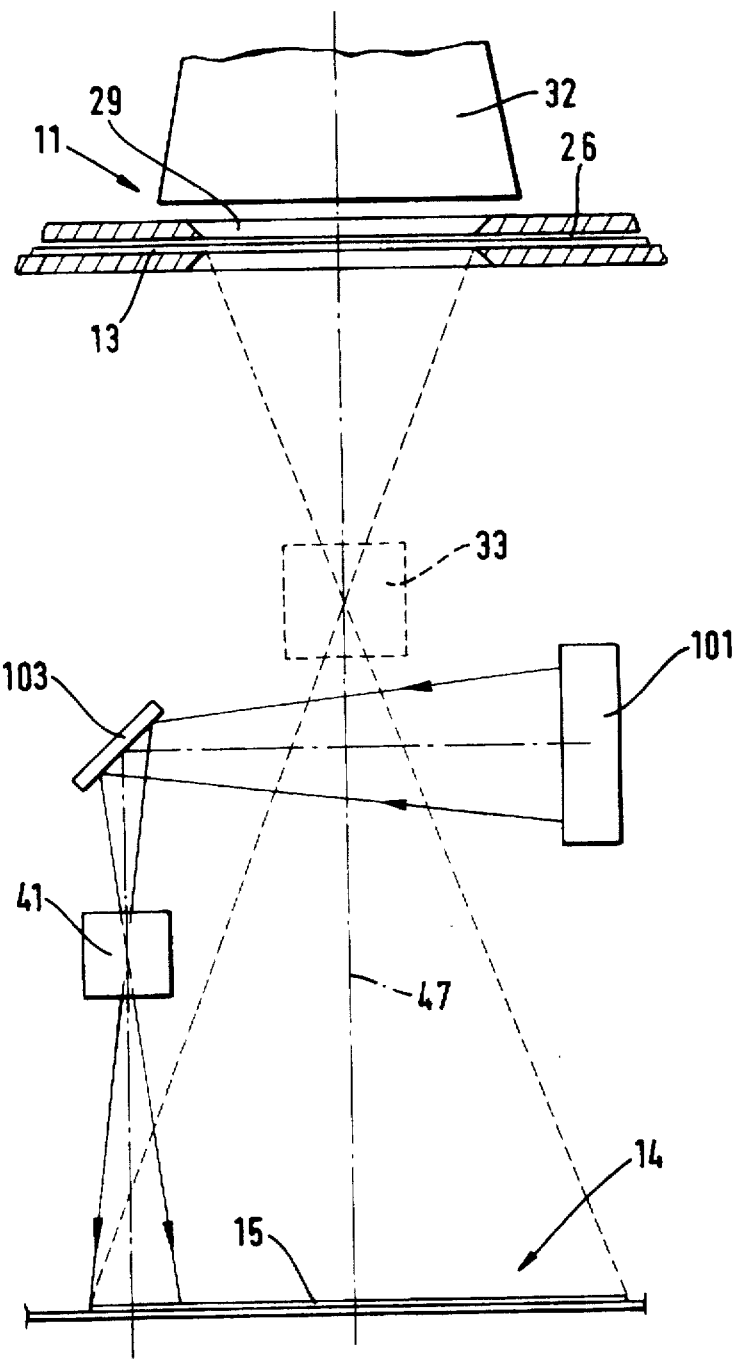
FIG. 10 shows an exemplary embodiment for imprinting variable data into a margin area of index prints.

FIG. 10 represents an embodiment where only the variable data is to be imprinted into the margin area of the index print. In this case, the LCD matrix 101 can be projected reduced, similarly to the embodiment of FIG. 12, via a fixed mirror 103 outside the area of the image rays and via the IP lens 41.

In the described exemplary embodiment, the successive exposure of the index print matrix is brought about by the coordinated displacement of IP lens and photographic paper. Instead of this, the IP lens can also expose for itself alone the area of the entire matrix if it were mounted on a cross-slide. Further possibilities, such as to either have the negative carrier or the paper carrier execute a movement in both axis directions, can be done in principle, but they are less practical.

In this connection, as an alternative to the suggested embodiment with the numbering of the image fields in the matrix line-wise from left to right and from top to bottom, the first column can also, for example, be numbered first from top to bottom and then analogously the other columns successively from left to right. The effect would be less movements of the paper conveyance and, instead, increased movements of the IP lens. The customer would have to become familiar with a rather unusual representation mode.

Because of the repeated exposures onto the same sheet of photographic paper with index prints, this sheet is exposed to the scattered light of the surroundings substantially longer than with standard prints. To avoid damaging effects on the quality of the index prints, protective measures against scattered light influences can be used in some cases.

Figure 11:
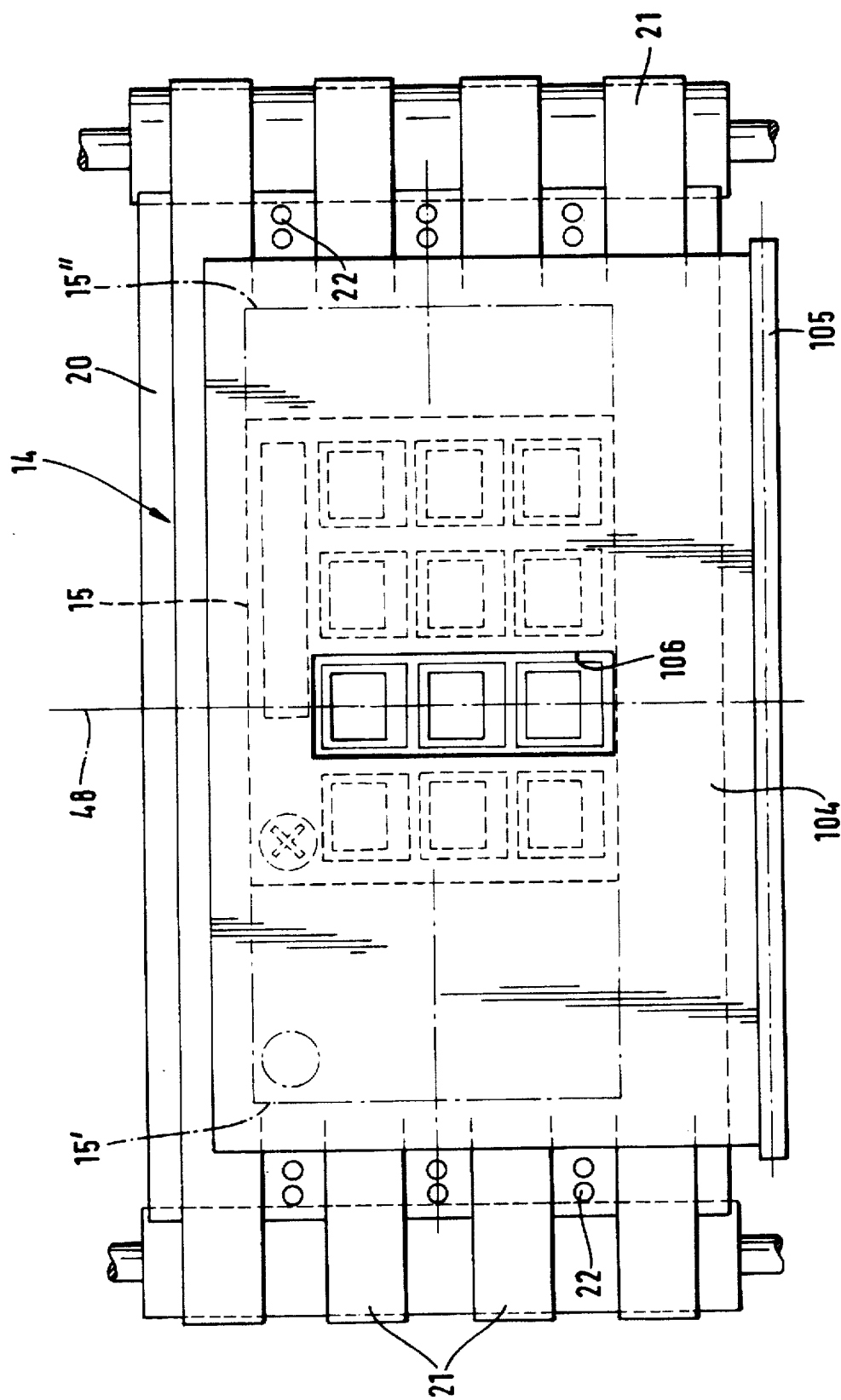
FIG. 11 shows an exemplary embodiment of a scattered light shielding means.

FIG. 11 Shows an embodiment that is suited to the previously described embodiment. The photographic paper 15 is situated on the paper carrier 14 via vacuum 20 and conveyor belts 21, in a position for the exposure of the images in the matrix elements. All exposures take place with the IP lens on the plane 48. In the process, the photographic paper is moved back and forth between the limit positions 15' and 15". A covering 104 that can be swivelled around a shaft 105 into a position slightly above the photographic paper, and having a slit-shaped recess 106 in the central part, prohibits scattered light from the space above the paper carrier from gaining access to the photographic paper. The covering takes up a rest position outside the projection ray path when no images of the IP matrix are to be exposed.

A method according to the invention is, in principle, also suitable for producing, for example, framed slides from index prints. Of course, the processing of such slides requires special slide printers or printers with slide adapters. Such printers are basically well-known and thus need no further explanation. Index prints on this basis can be useful for documentation purposes, for example for a lecture. They also prove valuable as security tools, for example to quickly put things back in order if the slides in the magazine of a projector get mixed up due to an operating accident.

For the future, new generations of film with magnetic coating can be expected. Film-specific data that are present on the films in, for example, bar-code form in current products, can then be magnetically recorded additionally or as an alternative. The invention can use these data just as advantageously as further camera-specific or user-specific data, for example.

As was already mentioned earlier on, the invention is not limited to providing, as individual image field data, image field numbers and those specially read from the film strip or otherwise transferred. Rather, other individual, image-related image field identification data can also be used as individual image field data. For example, such image identification data can, if no corresponding data are present on the film strip and/or the printing copy, be created in the computer during the production of the index print or can be preset. In the latter case, these image field identification data can also be a component of the fixed information of the image frame. In addition to numbers, these image identification data can also include other image-field-related data, for example in the form of alphanumeric characters or other symbols. The type of image field identification data can also be determined by image-field-related information possibly present on the film strip or the corresponding printing copy and read from it.

The manifold advantages of the invention are obvious:

Index prints make it possible to oversee the entire order without physically consulting the negatives, which thus remain protected.

The images of the index print are individually corrected and concur in this regard with the standard prints.

The images of the index print display photographic quality. Their resolution is not detracted from by digital grid pattern.

The coordination of the index print images with the negatives on the film strip is guaranteed by the image field numbers.

Each index print can be clearly coordinated with a specific film by way of the FID or twin check number.

Index prints can be used as advertisement carriers by corresponding arrangement of the image frame.

The equipment expense remains within acceptable limits because subassemblies on hand can also be used for creating the index prints.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Method for creating index prints on a photographic printer, comprising the steps of:

scanning a number of successive photographic copies on a film strip photoelectrically to obtain density values;

converting the density values into printer control values;

storing the printer control values; and producing an index print which includes plural individual images produced using the printer control values, said step of producing further including steps of;

grouping the individual images of the index print as a two-dimensional matrix with column elements and line elements;

successively exposing the individual images of the matrix photographically, directly from photographic copies of the film strip, exposure data being derived from the stored printer control values; and providing the individual images of the index print with individual image field data.

2. Method according to claim 1, wherein said step of scanning further includes a step of:

scanning said photographic copies point-by-point to obtain said density values for three colors and to obtain image field numbers.

3. Method according to claim 1, wherein said index print is exposed independently of standard individual prints, and wherein said step of scanning further including a step of:

scanning said photographic copies on the film strip one after another, the scanned data being evaluated and used directly as exposure values for transferring the photographic copies onto the index print.

4. Method according to claim 1, wherein index prints are created as a complement to standard individual prints obtained from the photographic copies of the film strip.

5. Method according to claim 4, wherein the standard individual prints are created first, one or more scan values of each photographic copy on the film strip being evaluated for creating the standard individual prints, said scan values being stored for later use for creating the index print, the photographic copies on the film strip being reproduced on the index print by an index print lens on a reduced scale relative to a scale of the standard individual prints.

6. Method according to claim 5, wherein the standard individual prints are created during a forward movement of the film strip and the index print is created during a reverse movement of the film strip.

7. Method according to claim 5, wherein the scanning of the photographic copies and exposure of the index prints occur during a forward movement of the film strip, and the standard individual prints are created during a reverse movement of the film strip.

8. Method according to claim 5, further comprising steps of:

scanning the photographic copies during a first forward movement of the film strip, creating at least one of the standard individual prints and the index print during a reverse movement of the film strip, and creating at least one of the index print and the standard individual prints during a second forward movement of the film strip.

9. Method according to claim 1, further comprising steps of:

exposing the index print step-by-step using the photographic copies of the film strip, centers of column elements of the index print overlapping a plane running perpendicular to a conveyance direction of the photographic paper and through an optical axis of an image-forming lens, the photographic paper being fed by a paper conveyance system, with centers of line elements being controlled by step-by-step displacement of the image-forming lens on said plane.

10. Method according to one of claim 1, further comprising steps of:

exposing the index print step-by-step using the photographic copies of the film strip and, when the photographic paper is stationary, controlling centers of column elements and line elements by step-by-step displacements of the image-forming lens in a direction parallel and crosswise to a conveyance direction of the photographic paper.

11. Method according to claim 1, further comprising a step of:

protecting at least some elements of said matrix from incidental light during said step of producing said index print to reduce interfering scattered light from influencing exposure of individual matrix elements of the index print.

12. Method according to claim 1, wherein the index print is formed as interlaced partial fields which include an image frame with at least one of predetermined text and graphics data, a data field with variable text data, and a field matrix with images of the photographic copies, the image frame having recessed surfaces for the data field and the image field data of the field matrix.

13. Method according to claim 12, further including a step of:

creating the image frame by photographic projection of a frame copy that is part of an index print film strip that is separate from said film strip of photographic copies.

14. Method according to claim 13, wherein the index print film strip includes several frame copies having at least one of different numbers of matrix elements and graphic arrangement, the method further including a step of:

selecting a respective frame copy from said index print film strip using properties of the film strip of photographic copies.

15. Method according to claim 14, wherein the frame copies include image field data represented by said at least one of predetermined text and graphics data.

16. Method according to claim 13, further comprising a step of:

using a projection system for both normal printing procedures of the printer and for photographic transfer of the frame copy.

17. Method according to claim 12, further comprising a step of:

transferring the variable text data onto the photographic paper by at least one of contact exposure and optical projection of a self-luminous or illuminable digital display unit.

18. Method according to claim 1, wherein the film strip is a negative strip.

19. Method according to claim 1, wherein the film strip is a reversal film strip.

20. Method according to claim 19, wherein individual frame slides of a reversal film strip are processed.

21. Method according to claim 1, wherein the individual images on the index print are represented upright and right-reading relative to an original image.

22. Method according to claim 1, wherein the individual images of the index print are individually corrected with respect to density and color.

23. Method according to claim 1, further comprising a step of:

using corrections for both production of the individual images of the index print and for creation of the standard individual prints.

24. Method according to claim 23, wherein individual corrections of an image are obtained partly by linking data associated with a first image with stored data of other photographic copies on the film strip.

25. Method according to claim 12, wherein the predetermined text and graphics data includes at least one of a name of a processing lab, an advertising text and a company logo.

26. Method according to claim 12, wherein the variable text data includes at least one of a film identification number and a date.

27. Method according to claim 12, wherein the variable text data includes at least one of a lab-internal processing number and a date.

28. Method according to claim 15, wherein as image field data, image field numbers present on the film strip are scanned, stored, and reproduced onto the index print.

29. Method according to claim 15, wherein as image field data, individually created or preset image field identification data are reproduced onto the index print.

30. System for creating index prints comprising:

a light-proof casing having a light source and a carrier for receiving and conveying a copy film strip;

a paper carrier for positioning and conveying photographic paper;

a projection lens for reproducing printing copies of the copy film strip onto the photographic paper in said light proof casing;

a scanning station for scanning an image surface of the printing copies and image field data present on the copy film strip to provide scan values;

a computer for determining exposure control values from the scan values determined by the scan station, for storing at least one of scan values and values determined from the scan values in a storage unit, and for coordinating and controlling functional sequences of the system;

an index print lens movable into an image-forming ray path separately from said projection lens and controlled by the computer, said index print lens being sufficiently movable at least in one dimension that it can reproduce a number of individual printing copies of the copy film strip as an index print having a matrix arrangement on the photographic paper; and exposure means for exposing individual image field data obtained from at least one of a scanning of the copy film strip, individual creation and preset information, in spatial coordination with prints of the individual printing copies of the index print on the photographic paper.

31. System according to claim 30, wherein the index print lens is movable step-by-step in a direction crosswise relative to a conveyance direction of the photographic paper.

32. System according to claim 30, wherein the index print lens is movable step-by-step in a direction parallel to a conveyance direction of the photographic paper.

33. System according to claim 30, wherein the exposure means further comprises:

at least one of a self-luminous display unit and an illuminable digital display unit.

34. System according to claim 30, further comprising:

frame projection means for exposure of an image frame onto the photographic paper.

35. System according to claim 34, wherein the frame projection means further comprises:

an index print film strip with at least one image frame copy, said system further comprising:

conveyance means, controlled by the computer, to insert the index print film strip into and remove it from said image-forming ray path.

36. System according to claim 30, further comprising:

scattered light shielding means for shielding exposed images of said index print from scattered light during exposure of the individual images of the index print.

37. System according to claim 30, wherein images on the index print are reproduced with a slight enlargement relative to the copy film strip.

* * * * *